W. R. JOHNSTON.
MOTOR CONTROL SYSTEM.
APPLICATION FILED SEPT. 4, 1913.

1,231,614.

Patented July 3, 1917.

WITNESSES:
Fred A. Lind.
J. R. Langley.

INVENTOR,
William R. Johnston
BY
Wesley G. Carr
ATTORNEY

UNITED STATES PATENT OFFICE.

WILLIAM R. JOHNSTON, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,231,614. Specification of Letters Patent. Patented July 3, 1917.

Application filed September 4, 1913. Serial No. 788,085.

*To all whom it may concern:*

Be it known that I, WILLIAM R. JOHNSTON, a citizen of the United States, and a resident of Wilkinsburg, in the county of Allegheny and State of Pennsylvania, have invented a new and useful Improvement in Motor-Control Systems, of which the following is a specification.

My invention relates to motor control systems such as are adapted to be employed in connection with oil well drilling rigs and similar machines.

My invention has for one of its objects to provide a means for automatically controlling the circuit connections of electric motors whereby they may operate at definite overload for a given time without danger of injury to the motor structure.

A second object of my invention is to provide a control system whereby the motor speed and motor current will be automatically controlled under varying loads.

In the operation of drilling machines and similar devices it may happen that the drill, or other tool, may become covered with earth from a cave-in or it may be obstructed in its withdrawal from the well, as by a bend in the hole or other causes. It is essential, therefore, in the employement of an electric motor for operating such devices, that, when the above circumstances arise, the circuit conditions be automatically controlled in order that a predetermined safe torque may be developed by the motor, while a sudden rush of current, which may burn out the motor windings, is avoided.

I provide a system which operates automatically, when a sudden overload is thrown on the motor, to insert resistance in series with the armature windings when the current rises above a predetermined value and to automatically cut out any resistance which may be in series with the shunt field winding.

Figure 3:
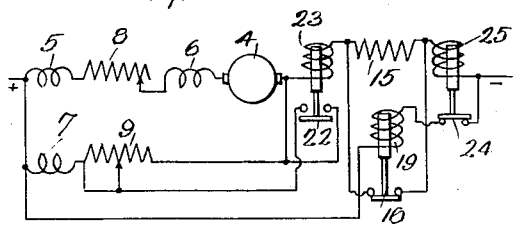
Figure 1:
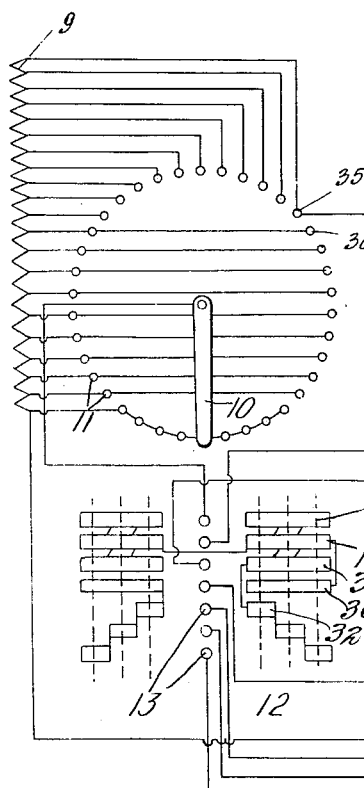
Figure 1:
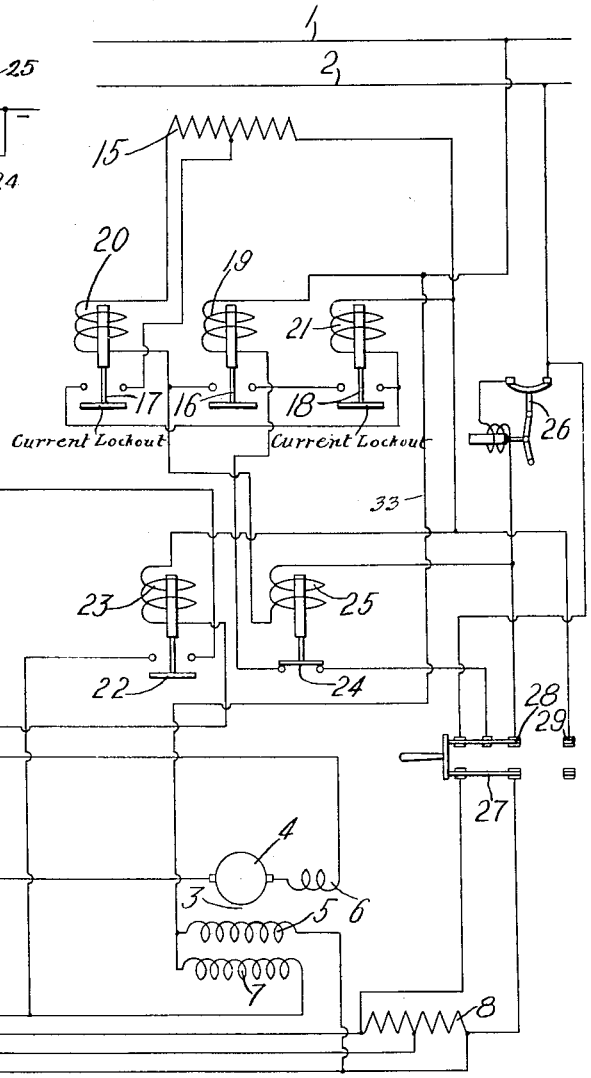
Figure 2:
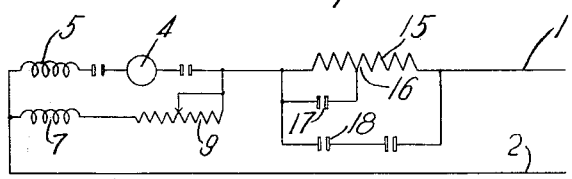

In the accompanying drawings, Figure 1 is a diagrammatic view of circuits and apparatus embodying my invention. Fig. 2 is a similar view of a schematic arrangement of the motor circuits. Fig. 3 is a diagrammatic view of a simplified arrangement of the system shown in Fig. 1.

Current is supplied from any convenient source through line conductors 1 and 2 to a motor 3, the armature of which is indicated at 4. The motor 3 is provided with main and auxiliary series field windings 5 and 6, respectively, and a shunt field winding 7. A sectional starting resistor 8 is in series with the motor armature 4 and a sectional resistor 9 is in series with the shunt field winding 7.

A controller arm 10 successively engages contact pieces 11 which are connected to common points of the sections of the resistor 9. A drum controller 12, that is connected to the arm 10, comprises contact fingers 13 which coact with corresponding contact segments to control the resistor 8 and to control the direction of rotation of the motor.

A sectional resistor 15 is adapted to be connected in series with the motor armature under predetermined conditions and is controlled by switches 16, 17, and 18 having actuating coils 19, 20 and 21. A series switch 22, having a coil 23, controls a shunt circuit for the resistor 9. A series switch 24, having a coil 25 that is in series with the coil 20, controls the circuit of the actuating coil 19 of the switch 16. The coil 23 is arranged to operate at a lower current value than will operate the coil 25. Therefore, the coil 23 may operate independently of the coil 25 but the latter can not operate independently of the former.

During the normal operation of the motor, for example, in drilling, the protective devices above described may be dispensed with and the motor circuit may be controlled by the usual circuit breaker. I have provided a circuit containing a circuit breaker 26 which is operative when a double pole, double throw switch 27 is in its right hand position. In this position of the switch, the resistor 15 is short circuited through a circuit extending from the middle point 28 of the switch through the coil 25, coil 20, resistor 15 and the contact piece 29 of the switch.

In the left hand position of the switch 27, as illustrated, the circuit breaker 26 is short circuited, while the resistor 15 and the coils 25 and 20 are connected in circuit. The starting resistor 8 is also short circuited, the resistor 15 operating to control the armature current as later described.

It may be assumed that the switch 27 is in its left hand position, as shown. Normally, the switch 24 is closed and the coil 19 is energized to close the switch 16. To start the motor, the operator moves the controller arm 10 in the desired direction, as for example, to the left, as shown. In the first position of the controller, the contact fingers 13 engage the corresponding contact segments to close a circuit which extends from the line conductor 2 through one side of the switch 27, coils 25 and 20, resistor of 15, coil 23, contact segments 14 and 30 of the controller 12, armature 4, auxiliary winding 6, contact segments 31 and 32, the other side of switch 27, and series field winding 5, to the line conductor 1.

The coils 25 and 23 will not operate to open the switch 24 and close the switch 22, respectively, unless the current rises above predetermined values, as later described. The coil 20 is energized to close the switch 17. The switch 17, which operates as a lock-out switch, will not close until the current has reached a predetermined minimum value. The closing of the switch 17 allows current to flow from the common point of the sections of the resistor 15 through the switch 17 and coil 21 to the controller 12 and thereby short circuit one section of the resistor 15. The coil 21 is energized to close the switch 18, which is also a lockout switch, and completes a short circuit for the resistor 15 and the coil 20 through the switches 16 and 18 and coil 21 and thereby allow the switch 17 to open. The above cycle of operations occurs each time the armature current rises above a predetermined value. The further rotation of the controller arm operates to insert sections of the resistor 9 in series with the shunt field winding 7 to accelerate the motor.

The circuit for energizing the shunt field winding 7 extends from the line conductor 1 through conductor 33, shunt field winding 7, a portion of resistor 9, arm 10, controller segments 34 and 14, coil 23, coil 21, switches 18 and 16, coil 25 and switch 27 to line conductor 2. When the arm 10 engages contact piece 35, the motor operates at its normal speed.

When the controller arm 10 is actuated in a counter clockwise direction from its off position, the connections of the armature circuit are reversed by the controller 12 and the motor rotates in the opposite direction. The arm 10 operates, as before, to insert the resistor 9 in circuit with the shunt field winding. When the arm 10 engages contact piece 36, only a portion of the resistor 9 is in circuit and the motor operates at approximately half its normal speed. The engagement of the adjacent contact piece 35 by the arm 10 operates to insert the entire resistor 9 in circuit to produce full speed conditions.

The controller is thus arranged to effect a gradual increase in speed until approximately half normal speed is reached and then, in a single step, to produce full-speed conditions.

It may be assumed that the operator has thrown the controller handle to full-speed position to hoist a drill, or other tool, from an oil well in which there has occurred a cave-in of sufficient extent to allow the motor to rotate very slowly. Ordinarily, a rush of current would immediately open the circuit breakers or, if the latter were held closed, the motor would be damaged by the excessive heat developed. In this case, however, an excessive current value first operates to close the series relay switch 22 to complete a shunt circuit for the resistor 9 and thereby allow a maximum value of current to flow through the shunt field winding 7.

If the current reaches a second and higher predetermined value, the switch 24 is opened to break the circuit of the coil 19 and allow the switch 16 to open. Current then flows through the resistor 15 which is in series with the armature. These actions take place regardless of the position of the controller handle, and it is not necessary for the operator to change the position of the same. The automatic strengthening of the magnetic field of the motor and the insertion of resistance in the armature circuit operate to prevent the current from exceeding a predetermined value and insure that the motor will develop a torque which may be adjusted according to the heat-dissipating qualities of the motor.

The maximum safe torque developed under the above conditions may operate to gradually pull the drill loose from the obstructing material. When the drill is free, the speed of the motor increases rapidly, and the increased counter electromotive force causes a decrease in the armature current until it falls below the predetermined value at which the series relay switch 24 is arranged to open. The switch 24 then closes, thereby energizing the coil 19 to close the switch 16. The resistor 15 is then short circuited in the manner above described.

When the motor speed is sufficiently high to cause the current value to fall below the predetermined value at which the switch 22 opens, the resistor 9 is again inserted in the field circuit. The sudden weakening of the magnetic field of the motor causes an increase of speed but it may also cause a rush of current due to the decreased counter electromotive force of the motor.

Should the current rise to the predetermined value arranged for the coil 23, the switch 22 closes the shunt circuit around the resistor 9, and full field strength is applied to the motor. This action may take place independently of the switch 24, which is adjusted to operate at a higher current value. As soon as the current value decreases sufficiently, the switch 22 again opens and the motor armature speed is again increased.

This action continues, the switch 22 acting in the manner of a Tirrill regulator until the armature reaches full speed.

It is desirable, in the interest of economy of time, to accelerate the motor from a standstill to full speed as quickly as mechanical and electrical conditions will justify. In the system I have provided, the controller handle may be thrown from the "off" position to the full-speed position at once, and the motor will accelerate to full speed automatically as quickly as is consistent with the load which the motor may safely carry. The operation of the switches 22 and 24 will be the same as that above described in connection with the operation of the motor in pulling tools from a "cave-in."

In case the motor becomes stalled, it is not necessary for the operator to adjust the controller handle, as the control system operates automatically to develop a maximum safe torque, which may be somewhat above normal full load torque, for a limited time. Should the motor be able to start the load by rotating slowly with a maximum torque, it will automatically attain full speed as the load decreases to a normal value. In case the motor is unable to move the load after a safe time has expired, the controller may then be returned to the "off" position.

By means of this system, the motor may be used to assist mechanical devices, as hydraulic jacks, in overcoming static friction as, for example, in the operation of pulling casings from the drilled hole. When the casings are once in motion, the motor may then continue to withdraw the same without auxiliary power devices.

It will be noted that the system above described may be used in substantially the same manner and as a substitute for steam apparatus.

When the motor is operated to perform work in which conditions do not require the use of the protective resistance 15, the operator may throw the switch 27 to its right hand position to connect the circuit breaker 26 in circuit. The change from one control system to the other may be readily made at any time as operating conditions require.

I claim as my invention:

1. In a motor control system, the combination with an electric motor, having armature and field magnet windings, of means controlled by the current traversing the armature circuit for increasing the current traversing the field magnet windings and means for subsequently decreasing the current traversing the armature windings when the armature current reaches a predetermined value.

2. In a motor control system, the combination with an electric motor having armature windings and field magnet windings, of means comprising a plurality of electromagnetic switches for controlling the currents traversing the armature windings and the field magnet windings successively as the armature current reaches progressively decreasing predetermined values.

3. In a motor control system, the combination with an electric motor having armature windings and field magnet windings, of means comprising a plurality of electromagnetic switches for controlling the currents traversing the field magnet windings and the armature windings successively as the armature current reaches progressively increasing predetermined values.

4. In a motor control system, the combination with a motor having armature and field windings, of a plurality of electromagnetic switches for automatically controlling the flow of current in said windings at predetermined maximum and minimum values of current in said armature windings.

5. In a motor control system, the combination with a motor, and a source of current, of a controller having a series of steps for gradually accelerating said motor to a predetermined speed and having a single step for acceleration from said predetermined speed to full speed, and means for intermittently inserting resistance in circuit with the field winding of said motor.

6. In a motor control system, the combination with a motor and a source of current, of means for automatically accelerating said motor comprising switches for successively controlling the currents traversing the armature and field windings of said motor at progressively higher predetermined values of current in said armature windings.

7. In a motor control system the combination with a motor, and a controller in circuit therewith, of means for automatically accelerating said motor when said controller is placed at full-speed position, and for automatically causing said motor to develop a predetermined torque under excessive load conditions.

8. In a motor control system, the combination with a motor, of means for controlling the field windings of said motor when the armature current reaches a predetermined value, and for controlling the armature windings when the said current reaches a second and higher predetermined value.

9. In a motor control system, the combination with a motor having armature and field windings, of a plurality of resistors, and means for inserting one of said resistors in series with said armature windings when the armature current reaches a predetermined value, and for shunting a second of said resistors that is in series with the field windings at a second and lower predetermined value of said armature current.

10. In a motor control system, the combination with a motor having armature and shunt field windings, of resistors for controlling the flow of current in said windings, and means for automatically decreasing the resistance in series with said armature windings and for increasing the resistance in series with said field windings when the armature current rises to successively higher predetermined values.

11. In a motor control system, the combination with a motor, of a resistor for controlling the current supplied to said motor, a circuit comprising means for controlling said resistor, a circuit comprising a circuit breaker, and means for controlling the connections of said circuits.

12. In a motor control system, the combination with a motor, of a resistor, means for automatically controlling said resistor, a circuit breaker and means for connecting either the controlling means or said circuit breaker in circuit with said motor and for short circuiting the other.

13. In a motor control system, the combination with a motor, of a resistor for controlling the armature current of said motor, a circuit comprising means for controlling said resistor, a circuit comprising a circuit breaker, and means for short circuiting either of said circuits, as desired.

14. In a motor control system, the combination with an electric motor having armature and field magnet windings, of means, operable when the current traversing the armature windings is increasing, for automatically controlling the flow of current through said windings in accordance with predetermined maximum values of current traversing the armature windings.

15. In a motor control system, the combination with an electric motor having armature and field magnet windings, of means, operable when the current traversing the armature windings is decreasing, for automatically controlling the flow of current through said windings in accordance with predetermined minimum values of current traversing the armature windings.

In testimony whereof, I have hereunto subscribed my name this 14th day of August, 1913.

WILLIAM R. JOHNSTON.

Witnesses:
J. R. LANGLEY,
B. B. HINES.